Nov. 28, 1933.　　　　F. G. BROTZ　　　　1,937,313
VALVE ASSEMBLY
Filed May 10, 1933

Frank G. Brotz
INVENTOR
BY Lyman C. Conger
ATTORNEY

Patented Nov. 28, 1933

1,937,313

UNITED STATES PATENT OFFICE 1,937,313

VALVE ASSEMBLY

Frank G. Brotz, Kohler, Wis.

Application May 10, 1933. Serial No. 670,273

3 Claims. (Cl. 137—111)

My invention relates to improvements in valves for plumbing fixtures and the like, and the objects of my invention are to provide an improved valve having relatively few parts, to provide an improved method of securing the escutcheon to valve, and to provide means whereby the compression on the packing of the valve may be adjusted without removing or disturbing the escutcheon.

Figure 1:
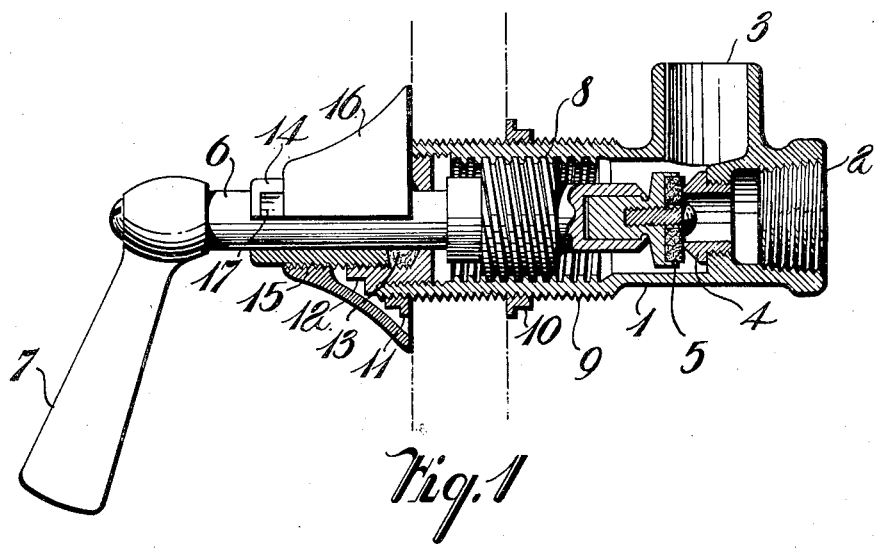
Figure 2:
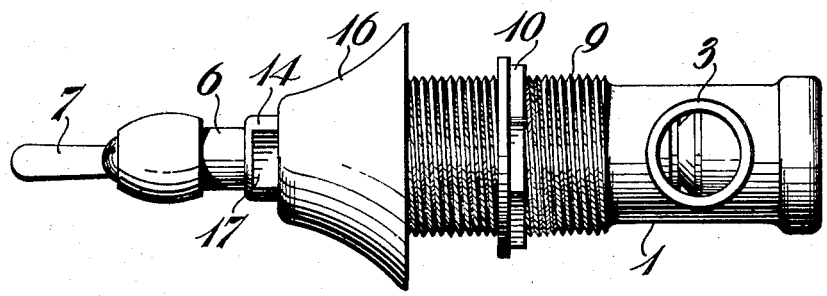

I attain these objects by the mechanism illustrated in the accompanying drawing, in which Figure 1 is a side elevation, partly in section, and Fig. 2 is a top view of my improved valve.

Similar numerals refer to similar parts throughout the several views.

In the drawing the numeral 1 refers to the valve body which is provided with an inlet opening 2 and an outlet opening 3 for attachment of inlet and outlet pipes. The inlet opening 2 is provided with the customary valve seat 4 closed by the valve 5 mounted on the valve stem 6. The valve stem 6 is provided with the operating handle 7 and has the customary coarse threaded connection to the valve body at 8 whereby the valve 5 can be raised from and lowered onto its seat 4. The valve body 1 is externally threaded at 9 to receive a pair of clamping nuts 10 and 11 whereby the valve may be attached to the wall of the bathroom, plumbing fixture or the like. This arrangement also provides adjustability to take care of any variation in thickness of walls, fixtures, etc.

The valve body 1 is internally threaded to receive the bonnet 12 which is provided with a central aperture to permit the valve stem 6 to pass therethrough, and serves to retain the packing 13 around the valve stem 6.

The sleeve 14 is externally threaded at 15 for a considerable portion of its length so that it may be screwed into the internally threaded bonnet to compress the packing 13. The escutcheon 16 is internally threaded to fit the threaded sleeve 14 and is held in place thereby and adjustable thereon. The sleeve 14 is preferably provided with flattened portions 17 so as to be more readily grasped by a wrench.

With the construction shown and described, it is unnecessary to remove the escutcheon to adjust the compression on the packing 13, as the packing may be tightened or loosened by turning the sleeve 14. The escutcheon, being fitted on the sleeve, may be readily turned by hand until it fits tightly against the wall or fixture. It will be evident to those skilled in the art that I have dispensed with the customary escutcheon holding nut, cheapening and simplifying the construction.

The relatively small portion of the sleeve 14 protruding from the escutcheon is smooth surfaced and may be plated, and does not detract from the appearance of the fitting.

The clamping nuts 10 and 11 provide adjustability and adapt the fitting to walls or fixtures of widely varying thicknesses, and obviate the necessity of having the protruding portion of sleeve 14 excessively long to take care of variations in the thickness of the wall, etc.

I claim:

1. In combination, a valve body, a bonnet threaded therein, a valve adapted to be seated therein, a valve stem attached to said valve and extending through said bonnet, a sleeve threaded into said bonnet, packing interposed between said sleeve and said bonnet adjacent said valve stem, and an escutcheon having threaded connection to said sleeve, said sleeve having an unthreaded portion extending through said escutcheon.

2. In combination, a valve body, clamping nuts threaded on said body and adapted to abut opposite faces of a wall or fixture whereby said valve body may be mounted thereon, a bonnet threaded in said body, a valve adapted to be seated in said body, a valve stem attached to said valve and extending through said bonnet, a sleeve threaded into said bonnet, packing interposed between said sleeve and said bonnet adjacent said valve stem, and an escutcheon having threaded connection to said sleeve, said sleeve having an unthreaded portion extending through said escutcheon.

3. In combination, a valve body, means for mounting said body on a wall or fixture, said means being adjustable to compensate for varying thicknesses of said wall or fixture, a bonnet threaded in said body, a valve stem extending through said bonnet, a valve attached to said valve stem and adapted to be seated in said body, a sleeve encircling said valve stem and externally threaded for connection to said bonnet, packing interposed between said bonnet and said sleeve and compressible by said sleeve, an escutcheon having threaded connection to said sleeve, said sleeve having a portion extending through said escutcheon.

FRANK G. BROTZ.